(12) United States Patent
Siu et al.

(10) Patent No.: US 7,976,968 B2
(45) Date of Patent: Jul. 12, 2011

(54) MICROBIAL FUEL CELL WITH FLEXIBLE SUBSTRATE AND MICRO-PILLAR STRUCTURE

(75) Inventors: Billy Siu, Vancouver (CA); Mu Chiao, Richmond (CA)

(73) Assignee: Sweet Power Inc., Victoria, British Columbia (CA)

( * ) Notice: Subject to any disclaimer, the term of this patent is extended or adjusted under 35 U.S.C. 154(b) by 1215 days.

(21) Appl. No.: 11/522,242

(22) Filed: Sep. 15, 2006

(65) Prior Publication Data

US 2007/0059565 A1    Mar. 15, 2007

Related U.S. Application Data

(60) Provisional application No. 60/717,504, filed on Sep. 15, 2005.

(51) Int. Cl.
*H01M 8/16* (2006.01)
*H01M 8/00* (2006.01)
(52) U.S. Cl. .................. 429/2; 429/400; 429/535
(58) Field of Classification Search .......... 429/12–46, 429/2
See application file for complete search history.

(56) References Cited

U.S. PATENT DOCUMENTS

| | | | |
|---|---|---|---|
| 3,226,262 A | 12/1965 | Rohrback et al. | |
| 3,331,848 A | 7/1967 | Davis et al. | |
| 3,340,094 A | 9/1967 | Helmuth | |
| 3,837,922 A * | 9/1974 | Ng et al. | 600/16 |
| 3,941,135 A | 3/1976 | von Sturm et al. | |
| 4,294,891 A | 10/1981 | Yao et al. | |
| 4,578,323 A | 3/1986 | Hertl et al. | |
| 5,976,719 A | 11/1999 | Kim et al. | |
| 6,270,649 B1 | 8/2001 | Zeikus et al. | |
| 6,294,281 B1 | 9/2001 | Heller | |
| 6,495,023 B1 | 12/2002 | Zeikus et al. | |
| 6,497,975 B2 | 12/2002 | Bostaph et al. | |
| 6,500,571 B2 | 12/2002 | Liberatore et al. | |
| 6,531,239 B2 | 3/2003 | Heller | |
| 2003/0203271 A1 * | 10/2003 | Morse et al. | 429/38 |
| 2004/0241528 A1 | 12/2004 | Chiao et al. | |

OTHER PUBLICATIONS

Chiao (Design of Microfabricated Microbial Fuel Cell, May 2001).*
Bennetto, H.P., "Electricity Generation by Microorganisms", *Biotechnology Education*, vol. 1, No. 4, 1990, pp. 163-168, reprinted by National Centre for Biotechnology Education, The University of Reading, www.ncbe.reading.ac.uk (© 1990, Pergamon Press plc.).
Katz, Eugenii, Itamar Willner, Alexander B. Kotlyar, A Non-Compartmentalized Glucose|$O_2$ Biofuel Cell by Bioengineered Electrode Surfaces, *Journal of Electroanalytical Chemistry* (© 1999, Elsevier Science S.A.), pp. 64-68.
Park, Doo Hyun, J. Gregory Zeikus, "Improved Fuel Cell and Electrode Designs for Producing Electricity from Microbial Degradation", *Biotechnology and Bioengineering*, vol. 81, No. 3 (© Feb. 5, 2003, Wiley Periodicals, Inc.), pp. 348-355.

(Continued)

*Primary Examiner* — Dah-Wei D Yuan
*Assistant Examiner* — Steven Scully
(74) *Attorney, Agent, or Firm* — Davis & Bujold, P.L.L.C.

(57) ABSTRACT

A microbial fuel cell includes a bio-compatible body having a micro-pillar structure defining an anode compartment adapted to contain a catalyst that metabolizes glucose to generate electrons and protons. A nano-porous membrane prevents loss of the catalyst from the anode compartment, while providing fluid access for ingress of glucose fuel and egress of waste.

2 Claims, 9 Drawing Sheets

OTHER PUBLICATIONS

Mano, Nicolas, Fei Mao and Adam Heller, "A Miniature Biofuel Cell Operating in a Physiological Buffer", *Journal of American Chemical Society*, vol. 124, No. 44 (© 2002, American Chemical Society), pp. 12962-12963.

Lee S.J., A. Chang-Chien, S.W. Cha O'Hayre, Y.I. Park, Y. Saito & F.B. Prinz, "Design and Fabrication of a Micro Fuel Cell Array With "Flip-Flop" Interconnection", *Journal of Power Sources*, Elsevier, vol. 112, (2002), pp. 410-418.

Young, Ho Seo and Cho Young-Ho, "Design, Fabrication and Characterization of Miniature Direct Methanol Fuel Cell Using Platinum-Sputtered Microcolumn Electrodes with Limited Fuel Source", *Sensors and Materials*, Myu Tokto, JP, vol. 16, No. 6, (2004), pp. 277-289.

* cited by examiner

MICROBIAL FUEL CELL WITH FLEXIBLE SUBSTRATE AND MICRO-PILLAR STRUCTURE

This application claims priority from U.S. Provisional Application Ser. No. 60/717,504 filed Sep. 15, 2005.

FIELD OF THE INVENTION

The present invention relates to a new structure for a microbial fuel cell that uses a flexible substrate and micro-pillars.

BACKGROUND OF THE INVENTION

Implantable devices require power source for functional operation. For example, pacemakers have been widely used to stimulate heart muscles and lithium batteries are used to provide power. Emerging technologies such as MEMS (MicroElectroMechanical Systems) promise to improve the quality of life for patients suffer from chronicle diseases. Implantable sensors made by MEMS technology have the advantages of low-cost, small-in-size, easy integration with the controlling integrated circuits (ICs) and low power consumption. However, the size of conventional lithium batteries is large compared to the MEMS-based sensors and post-processing will often be needed to integrate the battery with the sensors.

Published United States Patent Application 20040241528 (Chiao et al 2004) describes a MEMS-based microbial fuel cell in which a silicon substrate is used to fabricate miniature parallel fluid channels having a current collecting coating. Yeast is used as a catalyst. The fuel is glucose and is found in abundance within the human body. When yeast metabolizes glucose, electrons and protons are generated. Electrons are stored in biomolecules, such as NAD, the electrons are transferred to the anode by oxidation/reduction reactions. On the other hand, protons are diffused through a proton exchange membrane (PEM) and collected by the cathode. Electric power can be harvested by connecting the anode and cathode through a dissipating device. The application of the MEMS fuel cell is to provide a powering device that is long-lasting, self-sustain, small-in-size and easy integration with ICs and MEMS sensors.

SUMMARY OF THE INVENTION

According to the present invention there is provided a microbial fuel cell, which includes a bio-compatible body having a micro-pillar structure defining an anode compartment adapted to contain a catalyst that metabolizes glucose to generate electrons and protons. A nano-porous membrane prevents loss of the catalyst from the anode compartment, while providing fluid access for ingress of glucose fuel and egress of waste.

The above described MEMS-based microbial fuel cell is fabricated using polymeric materials. It has a larger surface-area-to-volume ratio that can increase the power output at least 4.5 times more than previously reported fuel cells. The advantages of the new fuel cell can be summarized below: (1) flexible substrate minimizes damage to the human body; (2) larger surface-area-to-volume ratio using a "micro-pillar structure" improves power output and (3) integration with a nano-porous membrane completely eliminates the need for micro-fluid ports.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

The preferred embodiment, a microbial fuel cell generally identified by reference numeral 10, will now be described with reference to FIG. 1 through 6.

Figure 1:
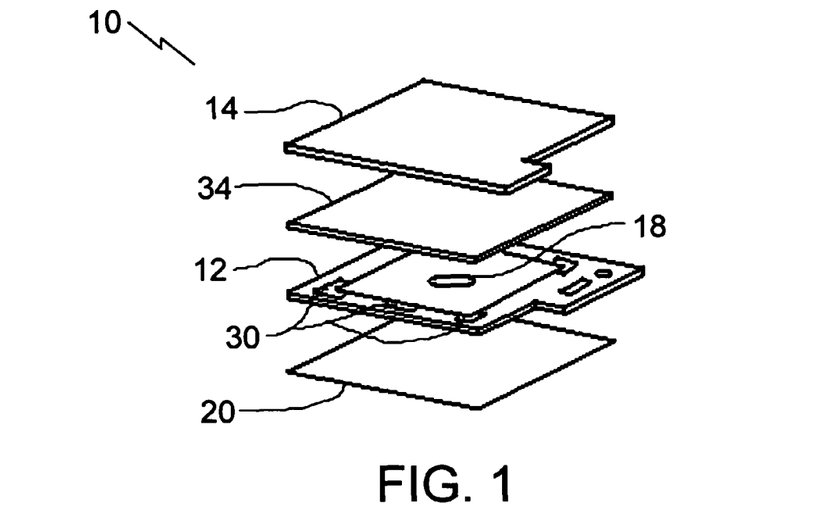
FIG. 1 is an exploded perspective view of a microbial fuel cell constructed in accordance with the teachings of the present invention.
Figure 2A:
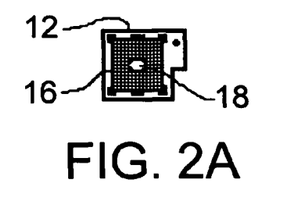
FIG. 2A is a top plan view of an anode used in the microbial fuel cell of FIG. 1.
Figure 2B:
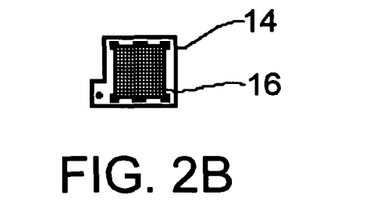
FIG. 2B is a top plan view of a cathode used in the microbial fuel cell of FIG. 1.
Figure 2C:
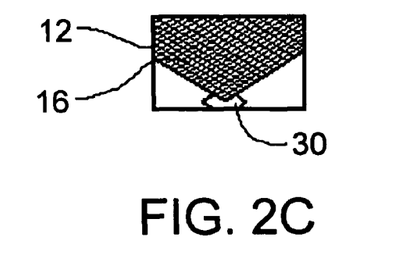
FIG. 2C is a detailed top plan view of the anode/cathode used in the microbial fuel cell of FIG. 1.
Figure 2D:
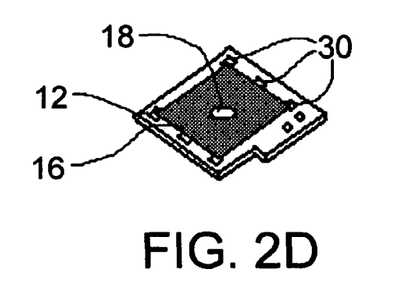
FIG. 2D is a perspective view of the anode used in the microbial fuel cell of FIG. 1.
Figure 3A:
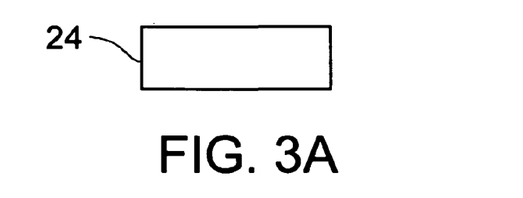
FIG. 3A through 3I is a side elevation view of the fabrication process for fabricating the microbial fuel cell illustrated in FIG. 1.
Figure 3B:
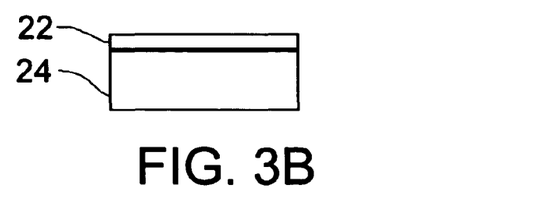
Figure 3C:
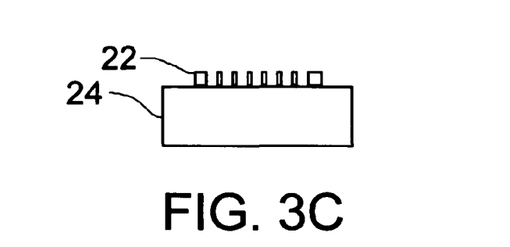
Figure 3D:
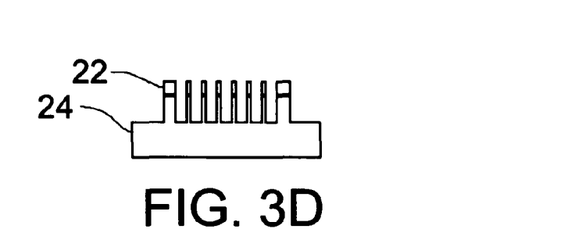
Figure 3E:
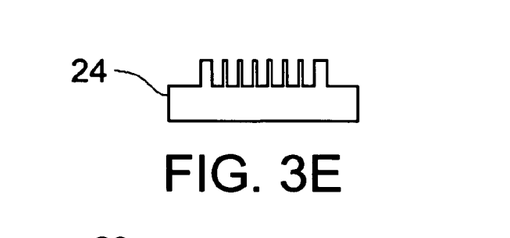
Figure 3F:
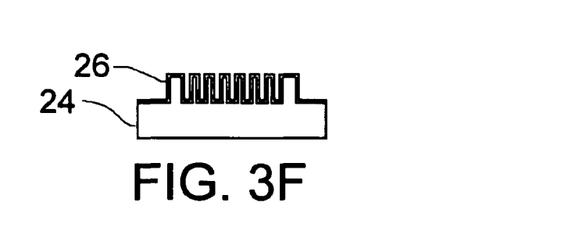
Figure 3G:
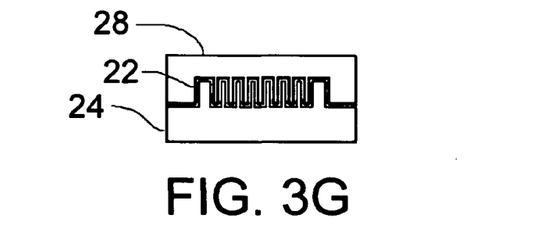
Figure 3H:
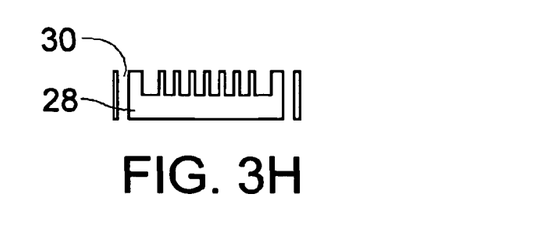
Figure 3I:
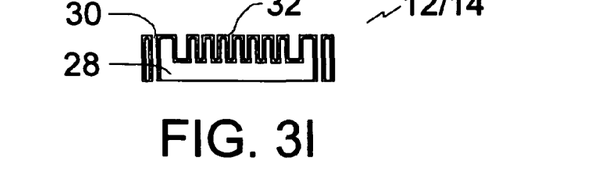
Figure 6:
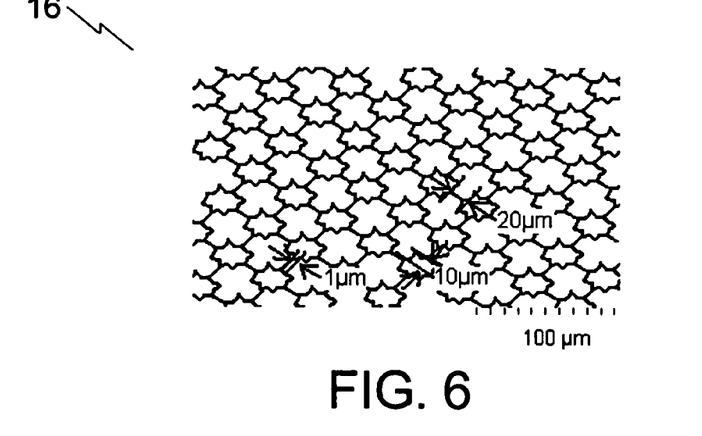
FIG. 6 is a schematic of the microbial fuel cell illustrated in FIG. 1, illustrating a micro-pillar structure.

FIG. 1 shows an exploded view of the proposed fuel cell 10. Bio-compatible polymeric materials, such as Polydimethylsiloxane (PDMS) is coated with a thin-film gold electrode and is used as the anode 12 and cathode 14. Based on the morphology of target implantation sites, the PDMS anode 12 and cathode 14 can be fabricated to form a specific geometry, thus can minimize damage to the body during implantation. Other bio-compatible polymeric materials can also be used. For example, polylactide-co-glycolide (PLGA) and polycarbonates are suitable for this application. Furthermore, the PDMS 12/14 is shaped with a micro-pillar structure 16, as shown for the cathode 12 in FIG. 2A through 2D. Referring to FIG. 6, the micro-pillar structure 16 is a column structure that is typically 10 micrometer×10 micrometer×8 micrometer. Higher aspect-ratio micro-pillar structures can be made by shrinking the cross-sectional area and by increasing the height of each micro-pillar. Theoretically, the surface-area-to-volume ratio will increase with the aspect ratio of the micro-pillar structure 16. Referring again to FIG. 1, in order to keep the yeast inside the anode compartment 18 during operation, a mechanical constraint is necessary, however, the glucose and wastes must be allowed to move freely in and out of the fuel cell. A nanoporous membrane 20 (polycarbonate)

is used to provide fluid access of the glucose fuel and wastes (water and $CO_2$). Immunoisolation is provided by the nanoporous membrane 20 since the pore size (10 nm) is small enough to prevent yeast from leaking out from the anode compartment 18. Antibodies will be blocked from entering the anode compartment 18 due to the physical size of most antibodies (10-25 nm).

FIG. 3 shows the fabrication process of the PDMS anode 12 and cathode 14. Micro-pillar structures 16 are formed by a process similar to the soft lithography process using a silicon mold. First, referring to FIG. 3A through 3C, 5000 Å silicon dioxide 22 is grown on silicon substrate 24, and is patterned using a plasma-assisted etching process. Referring to FIG. 3D, silicon substrate 24 is then etched at room temperature using $XeF_2$ and 800 mT $N_2$ gaseous mixture. Referring to FIG. 3E, the silicon dioxide mask 22 is then removed in BOE. The silicon substrate 24 serves as a mold and has complementary patterns of the micro-pillar structure 16. Referring to FIG. 3F, the silicon wafer 24 is coated by a Cr(500 Å) and Au(2000 Å) coating 26. This gold thin-film layer serves as a "sacrificial" layer that enhances the later PDMS demolding process. Referring to FIG. 3G, premixed 10:1 ratio PDMS (DuPont Sylgard 184) 28 is spin-coated onto the silicon mold 24. After 1 hr degassing in a vacuum chamber, it is cured at 60° C. for 2 hrs. Referring to FIG. 3H, during the de-molding process, it was found that the sacrificial gold thin-film increased the yield significantly, which has not been previously reported in the literature. Experimentally, it was found that the deposition rate of the sacrificial gold film has a significant effect on the de-molding process. For example, the deposition rate less than 2 A/sec can create a smooth surface that does not adhere to the PDMS well and the de-molding process will occur smoothly. If the deposition rate is more than 2 A/sec, rough gold surface will be created and PDMS adheres onto the gold surface well, as such rupture in the PDMS often occurs during the de-molding process and the PDMS is no longer useful. Lastly, fluid accesses 30 are mechanically punched and, referring to FIG. 3I, 2500 Å Cr/Au 32 is evaporated onto the surface of the PDMS 12 or 14 as a conducting electrode.

Figure 4:
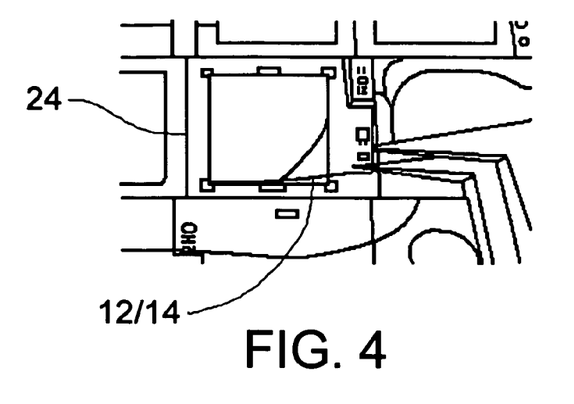
FIG. 4 is a perspective view of a de-molding process for the microbial fuel cell illustrated in FIG. 1.

FIG. 4 shows the de-molding process, with the PDMS 12 or 14 being peeled from the silicon substrate 24.

Figure 5:
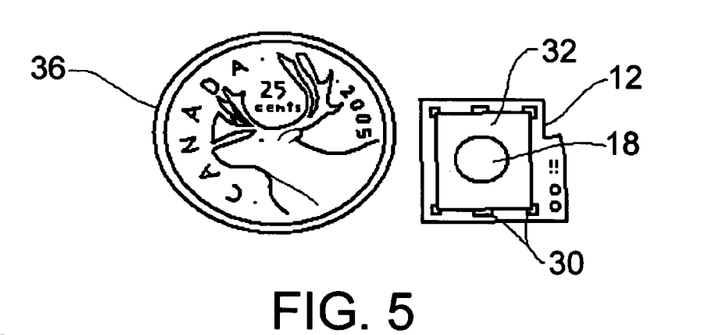
FIG. 5 is a perspective view of the microbial fuel cell illustrated in FIG. 1, with fluid ports and a quarter coin as a size comparison.

FIG. 5 shows the PDMS substrate 12 or 14 evaporated with Cr/Au 32, next to a Canadian quarter 36 for an approximate size comparison. Referring to FIG. 1, the PDMS anode/cathode 12 and 14 is then assembled with a PEM (proton exchange membrane) 34 and a nanoporous membrane 20 is then glued to the fluid access port 30, after dry yeast is packed into the anode compartment 18.

FIG. 6 shows a SEM (Scanning Electron Microscope) microphoto of the micro-pillar structure 16 on the PDMS surface. Micro-pillar structures 16 with an average height of 8 micrometer and a minimum feature size of 10 μm are fabricated. The space between each micro-pillar is 1 μm. The total number of micro-pillar structure is close to 54,000 in a 1.2 cm×1 cm area. The surface-area-to-volume ratio increases 3 to 5 times in the anode and cathode compared to previous published work and can be easily increased more, if micro-pillar structure is made higher and thinner.

Experimental Results

Table 1 below shows the experimental results based on two fuel cells. The first fuel cell (Microchannel MEMS-MFC) is made of conventional silicon substrates with no micro-pillar structure but bulk etched microchannels [Chiao et al, IEEE MEMS 2003]. The second fuel cell (Micro-pillar enhanced MEMS-MFC) is based on a flexible membrane with micro-pillar structures. The two fuel cells are tested under closely identical experimental conditions. Discharge experiments through various resistors were carried out to demonstrate the feasibility and improvement of the micro-pillar structure over existing approach. It is shown that the power density generated by the Micropillar enhanced MEMS-MFC has a better power performance than the Microchannel MEMS-MFC.

Further experiments were conducted at 37±0.5° C. to simulate the condition of normal human body temperature. Dehydrated yeast species, *Saccharomyces cerevisiae*, was cultured in pH 7.0 anolyte at 37° C. aerobically. D(+) Glucose with 1M concentration was instantly mixed with the yeast culture after 12 hr incubation. 15 μL bio-catalyzed fuel was then injected to the anode compartment of the fuel cell for an hour operation. Typical constituents of anolyte and catholyte are tabulated in Table 2 below. Chemically fed microbial fuel cell is situated in the 37° C. aerated isothermal environment monitored by K-type thermal couple (TL180, Circuit Test Electronic) plugged in to the microprocessor thermometer (HH23, Omega) with 0.4% accuracy. Voltage and current characteristics of the fuel cell were recorded by data acquisition system (NI 4070, 1 μV and 10 nA resolution) via Lab View 7.1 programming at 2 Hz sampling rate.

TABLE 1

Performance characteristics of previous microchannel MEMS-MFC and the micropillar structure MEMS-MFC

| Microbial Cell | Biocatalyst | Anolyte | Substrate | Mediator | Average OCV [mv] | Load [Ω] | Duration [min] | Current density [μA/cm$^2$] | Power density [μW/cm$^3$] |
|---|---|---|---|---|---|---|---|---|---|
| Microchannel MEMS-MFC | *S. cerevisiae* | Phosphate buffer (pH 7.0, 160 μL) | glucose (1M) | Methylene Blue (10 mM) | 343 (43 min) | 10 / 50 | 14 / 5 | 15$_{(max)}$ / 1.3$_{(max)}$ | 0.5 / — |
| Micropillar enchaned MEMS-MFC | | Phosphate buffer pH 7.0, 15 μl, @ 37° C. | glucose (1 M) | Methylene Blue (10 mM) | 420 (60 min) | 47 | 60 | 29.2$_{(max)}$ 8.2$_{(60\ average)}$ 14.2$_{(14\ average)}$ | 3.9$_{(max)}$ 0.4$_{(60\ average)}$ 1.0$_{(14\ average)}$ |
| | | | | | | 100 | 60 | 34.0$_{(max)}$ 5.1$_{(60\ average)}$ 10.5$_{(14\ average)}$ | 11.1$_{(max)}$ 0.5$_{(60\ average)}$ 1.5$_{(14\ average)}$ |
| | | | | | | 470 | 60 | 20.8$_{(max)}$ 2.7$_{(60\ average)}$ 5.9$_{(14\ average)}$ | 19.5$_{(max)}$ 0.6$_{(60\ average)}$ 2.2$_{(14\ average)}$ |
| | | | | | | 1000 | 60 | 17.4$_{(max)}$ 1.6$_{(60\ average)}$ 3.4$_{(14\ average)}$ | 29.1$_{(max)}$ 0.5$_{(60\ average)}$ 1.9$_{(14\ average)}$ |

TABLE 2

Chemical constituents in a MEMS microbial fuel cell.

| Chemicals | Concentration | Supplier |
|---|---|---|
| Anolyte (pH 7.0, aqueous solution) | | |
| Potassium phosphate Dibasic Anhydrous | 0.1M | Fisher Scientifics (BP363-500) |
| Potassium phosphate Monobasic | 0.1M | Fisher Scientifics (P285-500) |
| Methylene blue | 10 mM | Fisher Scientific (M291-25) |
| Catholyte (pH 7.0 aqueous solution) | | |
| Potassium phosphate Dibasic Anhydrous | 0.1M | Fisher Scientifics (BP363-500) |
| Potassium phosphate Monobasic | 0.1M | Fisher Scientifics (P285-500) |
| Potassium ferri(III)cyanide | 20 mM | Acros Organics (AC424125000) |
| Fuel | | |
| D(+) Glucose | 1M | Acros Organics (AC41095-0010) |
| Catalyst | | |
| Yeast *Saccharomyces cerevisiae* | 0.85 g (dry weight) in 10 ml Anolyte | Sigma (YSC1-100G) |

To quantify the effect of biocatalyst concentration for the fuel cell potential development, budding yeast, *S. cerevisiae* cultured with 4 to 14 hours was used for open circuit potential (OCV) measurement. A 15 μl drop of anolyte mixed with 1M glucose concentration was injected to the anode compartment for experiment.

Figure 7:
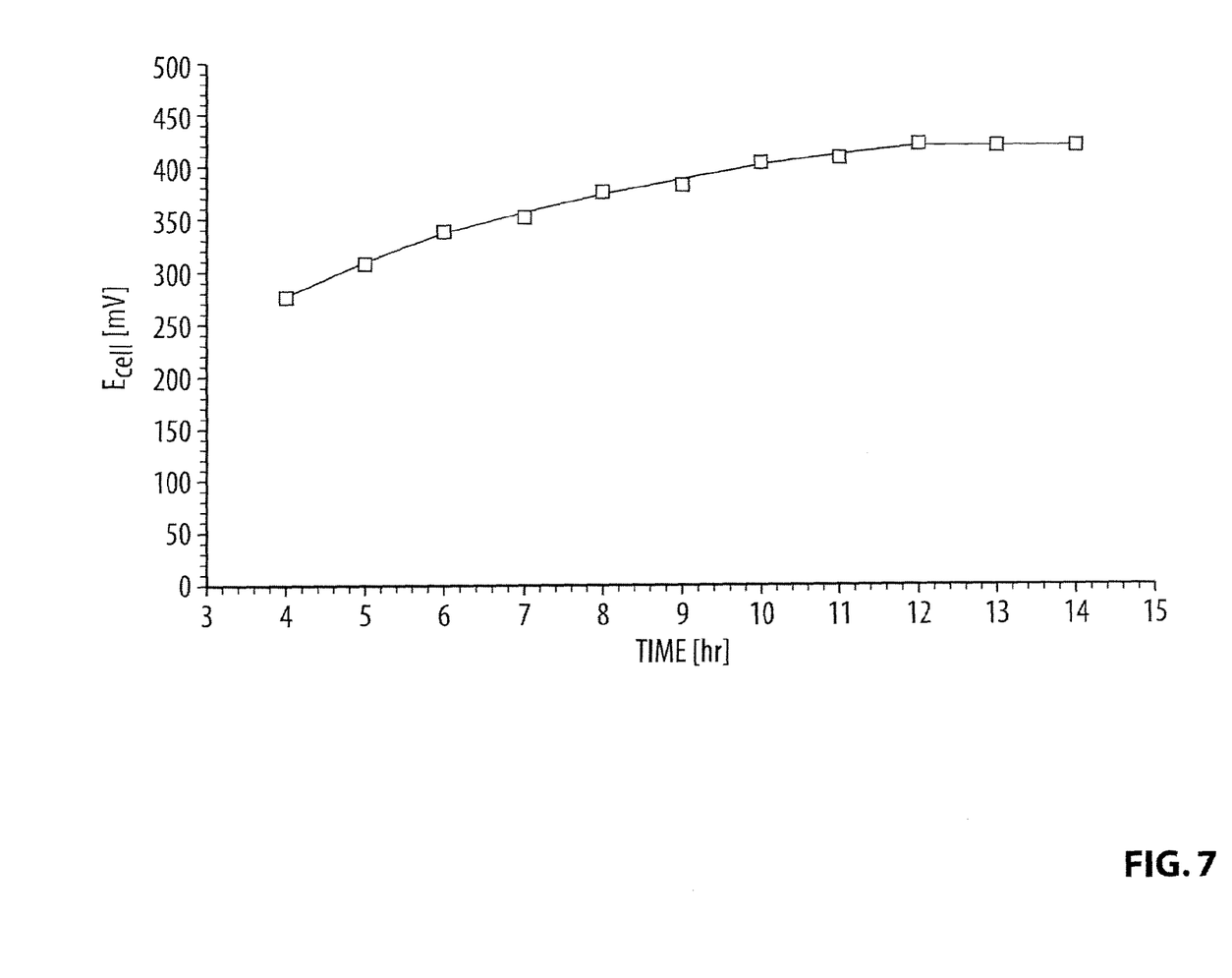
FIG. 7 shows the average open circuit potential (OCV) versus yeast culturing time.

FIG. 7 shows the average open circuit potential (OCV) versus yeast culturing time. The average OCV increased gradually and saturated after 12 hours incubation with 420 mV. Catalytically, this result implicates the amount of biocatalyst directly related to the potential development for the microbial fuel cell while the saturation is the consequence of the electrochemical nature of the fuel cell as well as the physiology of *S. cerevisiae* inside the fuel cell compartment.

FIG. 7: The effect of incubation time of *S. cerevisiae* on the microbial fuel cell average open circuit voltage for an hour operation. 85mg/ml dehydrated *S. cerevisiae* was cultured in 37 °C in pH 7.0, potassium phosphate buffer with 10mM Methylene Blue. The open circuit voltage was measured when 1M D-glucose was mixed with the cultured microbial solution.

Figure 8:
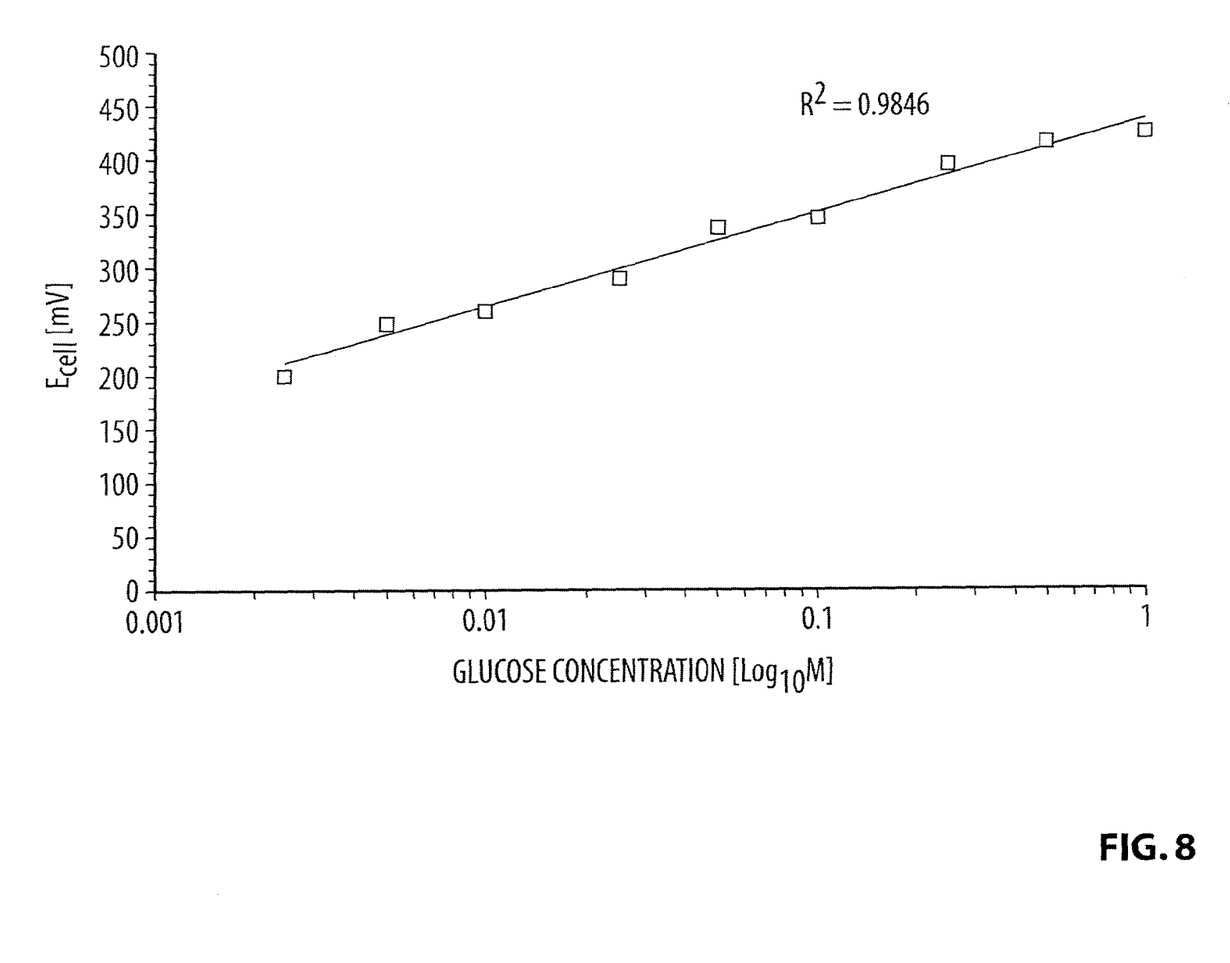
FIG. 8 shows the correlation of glucose concentration with OCV.

FIG. 8 shows the correlation of glucose concentration with OCV. Various glucose concentrations form 2.5 mM to 1M were adopted for the test with fixed 12 hours *S. cerevisiae* culturing. A strong logarithmic relation is reported between the average OCV and glucose concentration.

FIG. 8: Influence of glucose concentration on the open circuit voltage. 85mg/ml dehydrated *S. cerevisiae* was cultured in 37 °C in pH 7.0, potassium phosphate buffer with 10mM Methylene Blue for 12hr.

Figure 9:
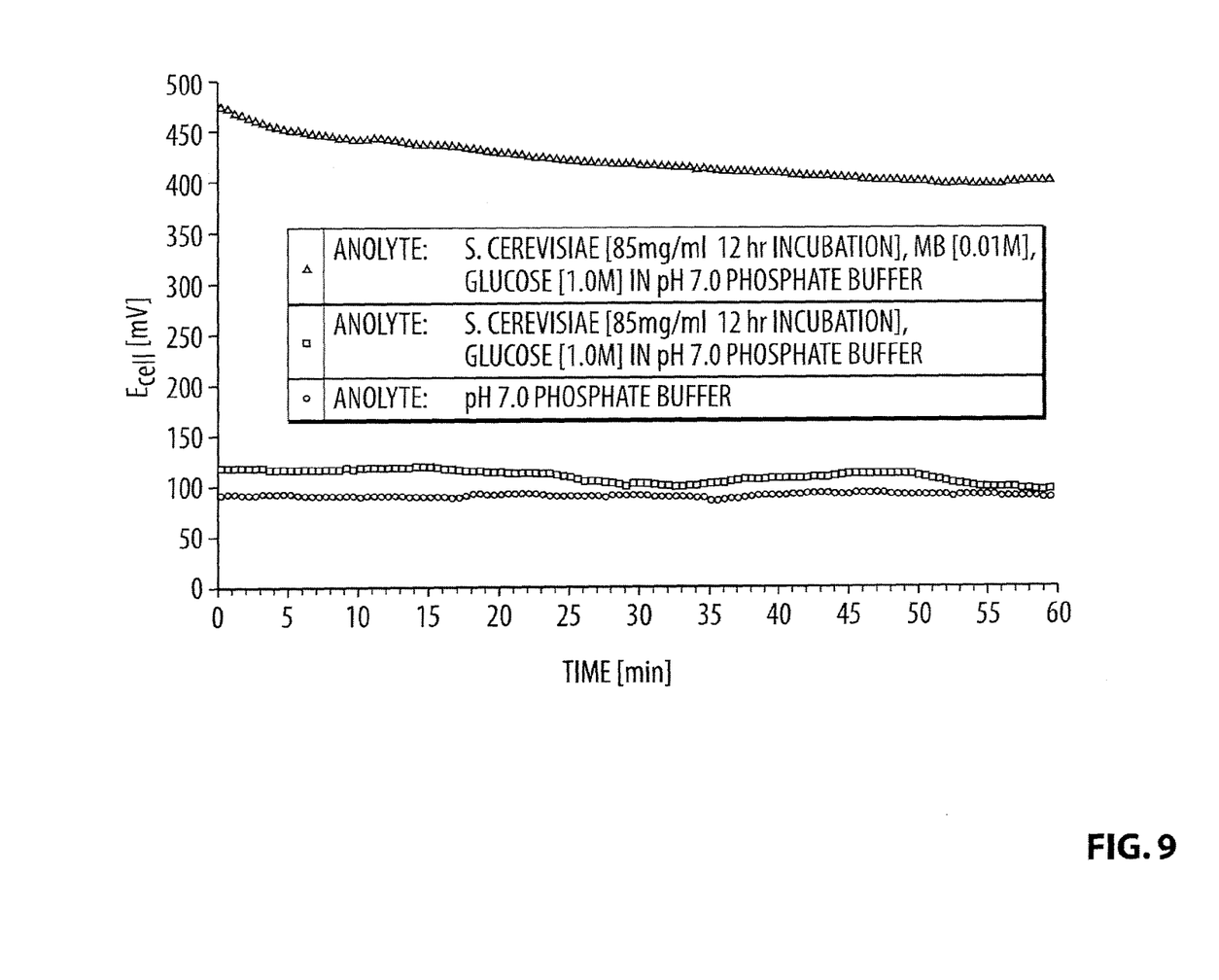
FIG. 9 shows evidence of the electron mediator, Methylene blue (MB), efficiently shuttling metabolic electrons from the microbial body to the electrode surface.

Based on the former experimental results, subsequent experiments were conducted with fixed incubation time of 12 hours and 1M glucose concentration. FIG. 9 shows the evidence of the electron mediator, Methylene blue (MB), efficiently shuttling metabolic electrons from the microbial body to the electrode surface. Samples with MB showed an OCV 4 times greater than samples without MB.

FIG. 9 Open circuit potential development of the microbial fuel cells under different anolyte constituents. Typical catolyte consists of 20mM potassium ferricyanide in pH 7.0 potassium phosphate buffer.

Figure 10:
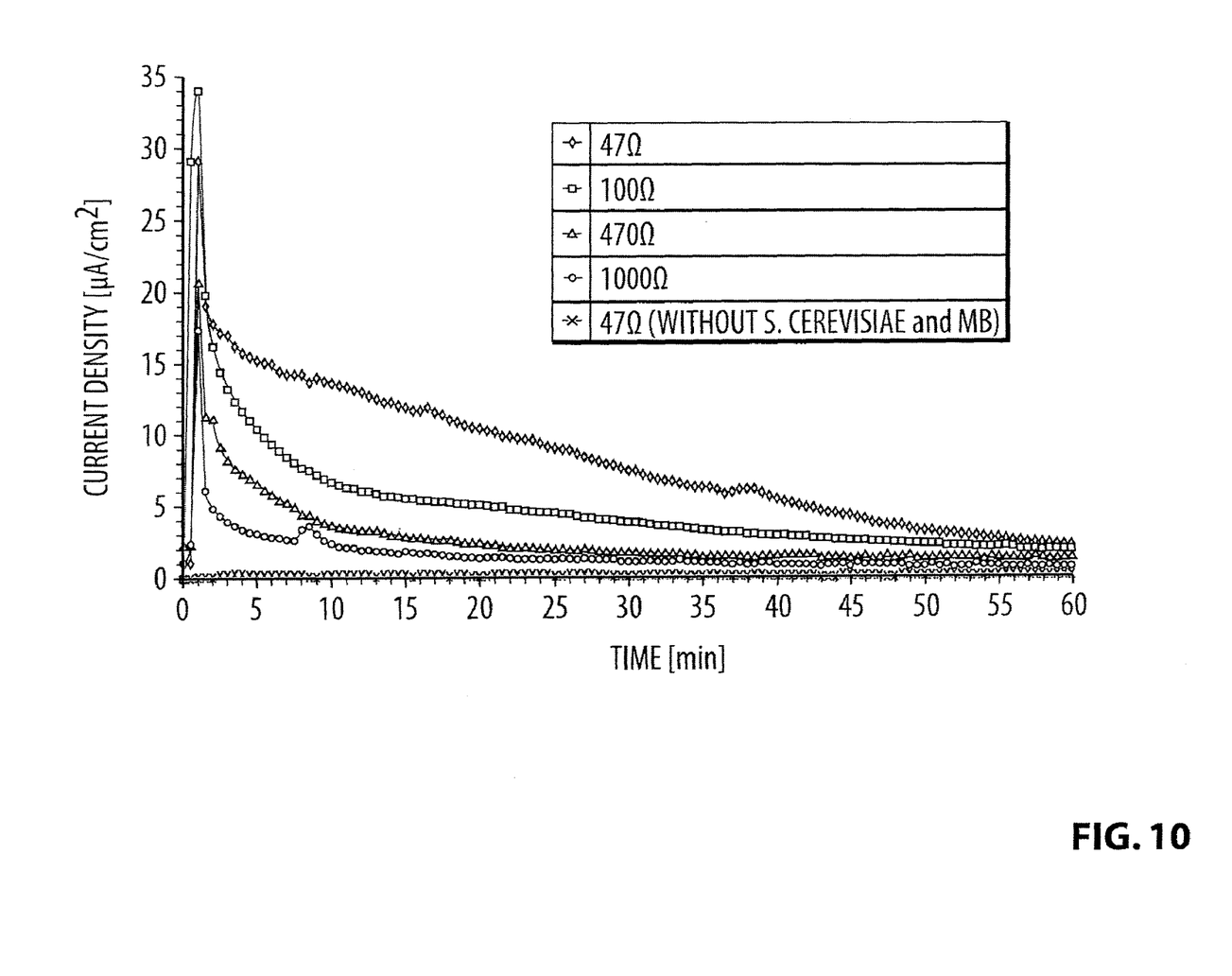
FIG. 10 shows the performance of current density powered by a single drop of 15μ I anolyte with 1M glucose solution.

FIG. 10 shows the current density of the fuel cell. Resistors (47Ω, 100Ω, 470Ω and 1000Ω) were connected to the MEMS fuel cell individually for one hour discharging time. A control experiment of 100Ω discharging with anolyte solely consisted of 1M glucose solution in pH 7.0 phosphate buffer was used to demonstrate the effect of glucose being bio-catalyzed for electricity generation.

FIG. 10 The performance of current density powered by single drop of 15μ I anolyte with 1M glucose solution.

Figure 11:
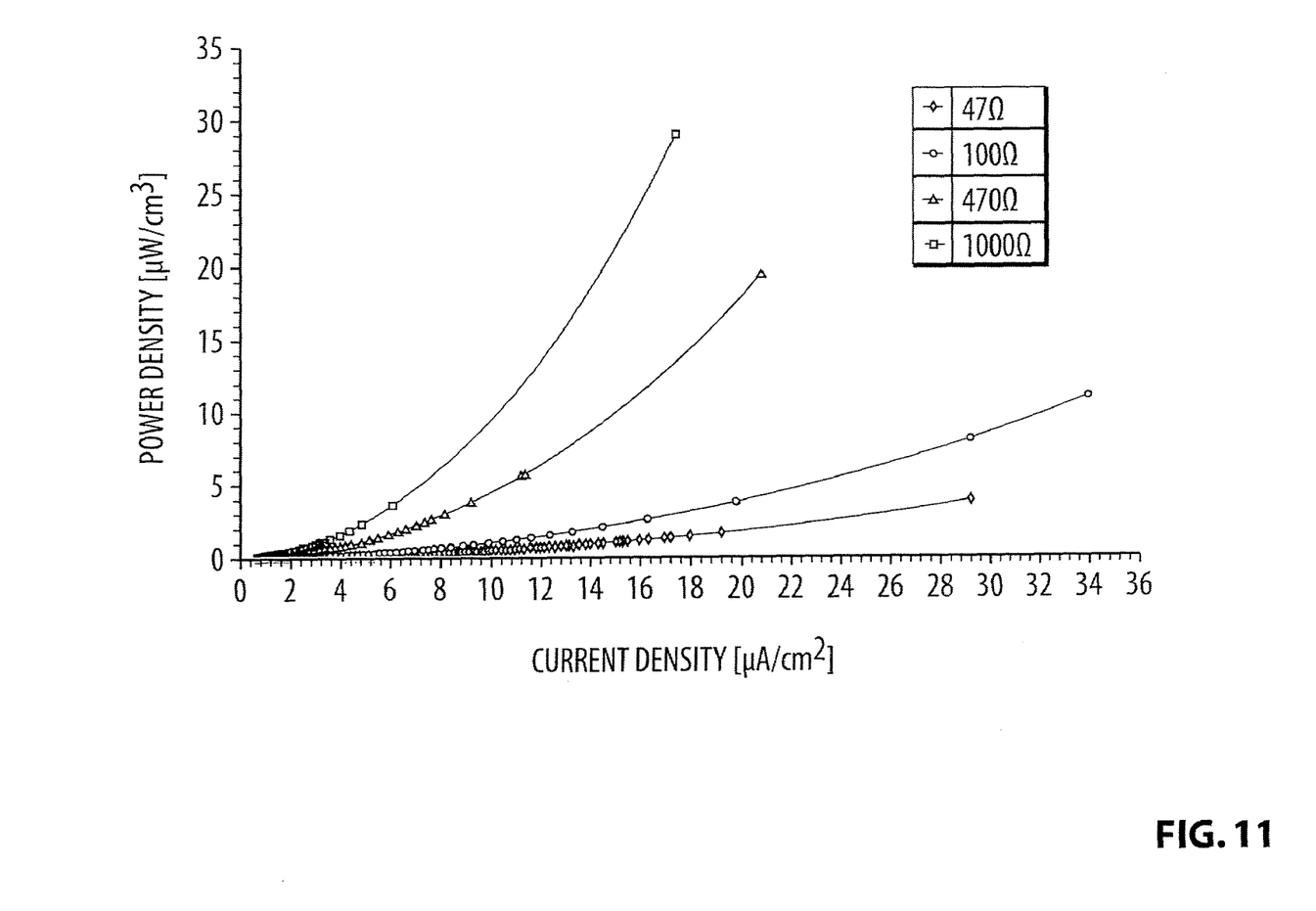
FIG. 11 shows the power density versus current density.
Figure 12:
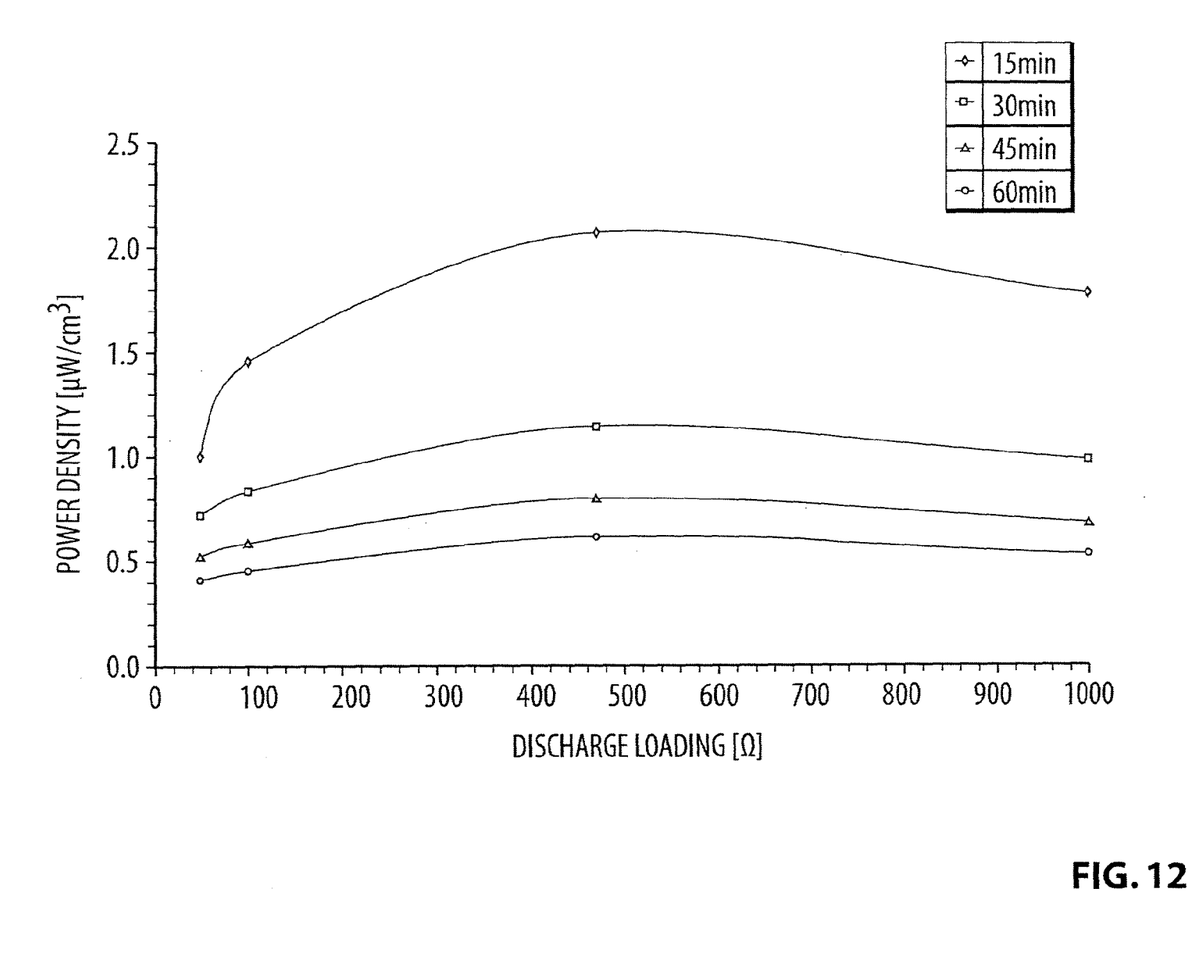
FIG. 12 illustrates the average power density generation under different discharge loadings in a certain period of time.

FIG. 11 shows the power density versus current density and FIG. 12 illustrates the average power density generation under different discharge loadings in a certain period of time.

FIG. 11: The corresponding power density based on the current density change under 47Ω, 100Ω, 470Ω and 1000Ω resistors.

FIG. 12: The characteristics of microbial fuel cell average power density powered by single drop of 15μ I anolyte with 1M glucose solution catalyzed by *S. cerevisiae*.

CONCLUSION

As described above, we have demonstrated that a fuel cell can be made of bio-compatible polymeric materials, such as PDMS. The fuel cell, as described above, is flexible. This flexibility is of benefit in minimizing damage to the human body both during and after installation. The fuel cell has higher surface-area-to-volume ratio compared to previous published work. The fabrication process of the micro-pillar structure using a gold sacrificial layer is novel. Experimental results show fuel cells with micro-pillar structure can produce more power than the previous microchannel type silicon fuel cells.

Furthermore, previously, the micro channel based MEMS fuel cell could only generate 0.50μ W/cm$^3$ for a 10Ω load [Chiao et al, IEEE MEMS 2003]. MEMS fuel cell with a micro pillar structure can provide 4.5 times more power density output at an average of 2.2μ W/cm$^3$ for a 470Ω loading in the same time duration (Table 1). Furthermore, previous micro channel based fuel cell generated 1iA/cm$^2$ current. The MEMS fuel cell with a micro pillar structure generates a peak 29.2μA/cm$^2$ and average of 8.2μA/cm$^2$ for 60 minutes operation.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

What is claimed is:
1. A microbial fuel cell comprising:
   a bio-compatible first body made from a flexible polymeric material having a micro-pillar structure, and a conducting layer laminated onto the flexible polymeric material defining a cathode;
   a bio-compatible second body being made from a flexible polymeric material having a micro-pillar structure with a conducting layer laminated onto the flexible polymeric material defining an anode compartment for containing a catalyst that metabolizes glucose to generate electrons and protons; and a nano-porous membrane preventing loss of the catalyst from the anode compartment, while providing fluid access for ingress of glucose fuel and egress of waste.

2. A method of fabricating a microbial fuel cell having a micro-pillar structure, including:
- forming a mold for an anode micro-pillar structure in a silicon substrate;
- coating the mold with a sacrificial gold film with a deposition rate of less than 2 A/sec;
- distributing a thin layer of bio-compatible polymeric materials into the mold;
- curing the polymeric materials;
- forming conducting electrodes and fluid access ports on the polymeric materials;
- assembling the anode micro-pillar structure with a cathode and a proton exchange membrane;
- placing a catalyst that metabolizes glucose within the anode micro-pillar structure;
- covering the fluid access ports with a nano-porous membrane adapted to prevent loss of the catalyst while facilitating fluid access through the fluid access ports for the ingress of glucose fuel and egress of waste.

* * * * *